Oct. 10, 1967

B. H. BILLINGS 3,346,319

ELECTRO-OPTIC VALVE WITH POLARIZING BEAM
SPLITTER AND REINFORCEMENT

Filed Sept. 25, 1963

INVENTOR.
Bruce H. Billings
BY
Morse & Altman
ATTORNEYS

United States Patent Office 3,346,319
Patented Oct. 10, 1967

3,346,319
ELECTRO-OPTIC VALVE WITH POLARIZING
BEAM SPLITTER AND REINFORCEMENT
Bruce H. Billings, Lincoln, Mass., assignor to Baird-Atomic, Inc., Cambridge, Mass., a corporation of Massachusetts
Filed Sept. 25, 1963, Ser. No. 311,345
6 Claims. (Cl. 350—150)

The present invention relates to electro-optic valves that block or transmit incident radiation in response to an applied electric signal and, more particularly, to light valves characterized by an assemblage of polarizing components, at least one of which exhibits polarizing characteristics that may be varied by an applied electric potential in order to produce polarizing relationships by which transmission of incident radiation is controlled.

In a typical electro-optic light valve, a single plate of so-called P type crystal is cut perpendicularly to its optic axis in such a way that when an electric field is applied in parallelism to this optic axis, the crystal becomes biaxial. In other words, the crystal behaves like a so-called retardation plate in which two components of incident radiation vibrating perpendicularly to the optic axis are propagated along the optic axis at different velocities. The amount of retardation is proportional to the applied electric field. An assemblage in which this plate is placed between linear polarizers, that are oriented at 45° angles with respect to the electrically induced axis of the plate, acts as a valve. The assemblage is opaque when no voltage is applied to the plate and is transparent when a voltage is applied to the plate, the maximum transmission occurring when the voltage produces one quarter wave of retardation. Ordinarily, the voltage is applied across transparent electrodes at opposite faces of the plate. In many applications, it is desired that the voltage required for application to such electrodes be reduced to a minimum, for example, in order to permit use of relatively small electric signals and extremely thin transparent electrodes.

The primary object of the present invention is to provide a novel electro-optic valve utilizing reflection rather than transmission of incident radiation, the valve comprising a polarizer, an electro-optic plate together with suitable electrodes, a quarter-wave plate and a reflector. In such an assemblage, the voltage required to produce opacity is reduced. In operation, light passing through the polarizer and the quarter-wave plate is returned by the reflector and the polarizer under the control of the electro-optic plate. If not retarded by the electro-optic plate, the light so returned is crossed relative to the polarizer whereby the electro-optic valve is opaque. If, on the other hand, retarded by the electro-optic plate across which a potential has been applied, the light so returned is aligned with the polarizer whereby the electro-optic valve is transparent. In accordance with the present invention, preferably, the polarizer is an oblique reflection polarizer or so-called Banning polarizer, in which an oblique sequence of laminated reflecting thin films at Brewster's angle with respect to the axis of the incident light splits the light into reflected and transmitted beams. In this preferred embodiment, as will become apparent below, light loss and consequently the necessary voltage applied to the electro-optic plate, are minimized.

Other objects of the present invention will in part be obvious and will in part appear hereinafter.

The invention accordingly comprises the system possessing the contruction, combination of elements and arrangement of parts, which are exemplified in the following detailed disclosure, the scope of which will be indicated in the appended claims.

For a fuller understanding of the nature and objects of the present invention, reference should be had to the following detailed description taken in connection with the accompanying drawings wherein.

Figure 1:
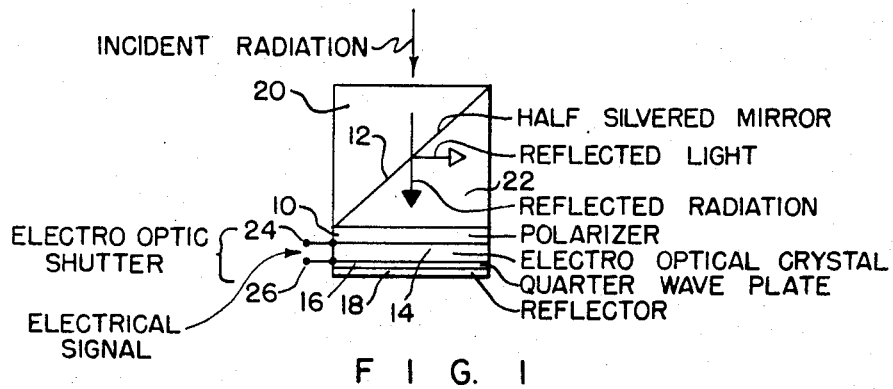
FIG. 1 is an exaggerated schematic view of an electro-optic valve embodying the present invention.

Generally, the electro-optic valves shown in the drawings and described specifically hereinbelow comprise, in optical sequence, a polarizer for at least partially polarizing incident radiation, an electro-optic crystal for transmitting without change or retarding to a predetermined degree radiation so polarized, a quarter-wave plate for imparting predetermined retardation and a reflector for returning radiation for emissions from the combination. In various forms, the polarizer is of the transmission or reflection type. Suitable transmission polarizers, for example, are: dichroic polarizers of the type referred to in U.S. Patent No. 2,454,515, in which a thin sheet of polyvinyl alcohol is heated, stretched and dyed with iodine; and birefringence polarizers of the type referred to in U.S. Patent No. 2,122,178, in which a myriad of miniscule polarizing crystals are oriented with respect to each other and embedded in an isotropic plastic sheet, the index of refraction of which is approximately the same as that of one of the principal indices of the crystal. The present invention is primarily concerned, however, with polarization of the incident radiation as effected by reflection from a sequence of strata disposed at Brewster's angle with respect to the incident beam. The strata generally is composed of a dielectric material composed for example of silver chloride, the mechanism of polarization being partial reflection and partial transmission. The electro-optic crystal, for example, is a primary ammonium phosphate having a pair of parallel optical surfaces substantially perperdicular to the Z axis. Specific examples of such a material are primary potassium phosphate and primary rubidium phosphate. Such electro-optical materials are described in U.S. Patent No. 2,463,109, and U.S. Patent No. 2,616,962. The quarter-wave plate is in the form for example of a thin sheet of mica. Preferably, the reflector is a metal having a reflector at least as great as aluminum, the metal itself being preferably aluminum or silver, produced for example by evaporation. The electrodes at opposite faces of the electro-optic plate preferably are composed of a transparent metal, for example a transparent stratum of gold or silver or a transparent inorganic compound such as Nesa glass or tin-oxide. Alternatively, these electrodes are in the form of metallic grids or apertured plates.

In FIG. 1, a simple electro-optic shutter embodying the present invention is illustrated as comprising in sequence a polarizer 10, an electro-optic crystal 14, a quarter-wave plate 16 and a reflector 18. A half silvered mirror 12 is positioned between a pair of glass prisms 20 and 22, being of appropriate thickness to transmit one-half and to reflect one-half of incident radiation on the electro-optic shutter. Polarizer 10 is a dichroic polarizer of the type described above. The opposite faces of electro-optic crystal 14 are coated with thin films of a conductor and are connected to a signal generator through leads 24 and 26. Quarter-wave plate 16 and reflector 18 cooperate with the remainder of the components in a manner now to be described.

Figure 4:
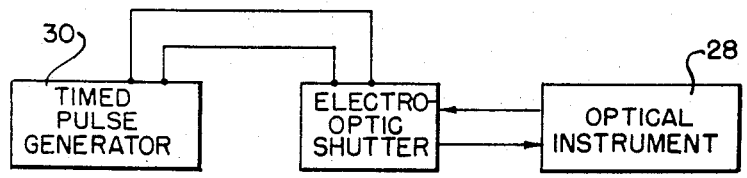
FIG. 4 is a block diagram of a system incorporating any of the electro-optic valves of FIGS. 1 to 3.

In operation of the shutter of FIG. 1, with reference to FIG. 4, light from or in conjunction with a suitable optical instrument 28 is directed toward the electro-optic shutter of FIG. 1 through half-silvered mirror 12. Ordinarily, this light is plane polarized by polarizer 10, is partially transmitted by half-silvered mirror 12, transmitted by electro-optic crystal 14, modified by quarter-wave plate 16, reflected by reflector 18 and finally reflected from the electro-optic shutter by half-silvered mirror 12. The black arrows indicate the incident radiation and the clear arrows indicate the reflected radiation. When no electrical pulse is applied from a suitable generator 30, across leads 24, 26 of the electro-optic plate, the incident radiation is retarded by quarter-wave plate 16 in such a way as to become crossed with respect to polarizer 10 on its return from reflector 18. In consequence, no radiation is emitted from the electro-optic shutter. On the other hand, when an electrical pulse of sufficient intensity is supplied across leads 24, 26 of the electro-optic plate, transmission occurs.

Figure 2:
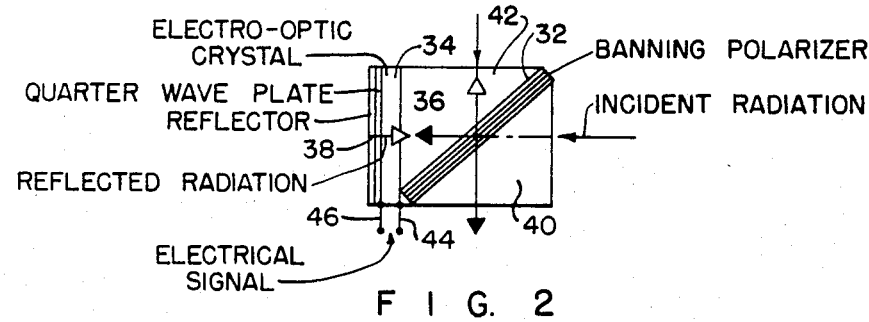
FIG. 2 is an exaggerated schematic view of a preferred electro-optic valve embodying the present invention.

Unfortunately, in the foregoing embodiment, the half-silvered mirror wastes available light to an undesired degree. A superior scheme is shown in FIG. 2 as comprising a reflection polarizer 32, an electro-optic crystal 34, a quarter-wave plate 36 and a reflector 38. Reflection polarizer 32 is in the form of a series of laminated strata, of the type described above, disposed between a pair of glass prisms 40 and 42. Electro-optic plate 34, quarter-wave plate 36 and reflector 38 are similar in every respect to their counterparts in FIG. 1, a pair of electrodes 44 and 46 being provided to transmit a signal from pulse generator 30 in order to control radiation emitted from and returned to optical instrument 28. At polarizer 32, transmitted radiation is polarized in one direction and reflected radiation is polarized at right angles thereto. Thus all radiation returned by reflector 38 is either reflected by polarizer 32 or transmitted therethrough depending on the voltage applied to leads 44, 46. This constitutes a saving of fifty percent in necessary operating voltage as opposed to an analagous conventional electro-optic shutter.

Figure 3:
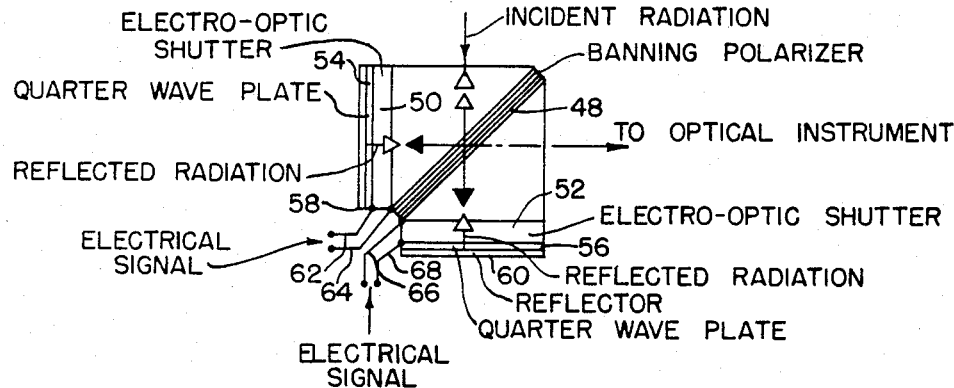
FIG. 3 is an exaggerated schematic view of another preferred electro-optic valve embodying the present invention.

The electro-optic shutter of FIG. 3 comprises a reflection polarizer 48, a pair of electro-optic plates 50, 52, a pair of associated quarter-wave plates 54, 56 and a pair of associated reflectors 58, 60. Each of the foregoing components is analagous in all respects to its counterpart in FIG. 2, the electrodes on opposite faces of electro-optic plates 50 and 52 being electrically controlled through pairs of leads 62, 64 and 66, 68. With no voltage on either valve, one-half the light from the source is transmitted to electro-optic plate 50 and the reflected light travels back toward the source. Also, one-half the light from the source is transmitted to electro-optic plate 52 and the reflected light travels back toward the source. When a voltage is applied to both electro-optic plates, resulting in retardation in each, light from the first electro-optic plate is directed into the optical instrument and light from the second electro-optic plate is directed into the optical instrument, the two resulting beams combining. This system differs radically from the single transmitting light valve in that 100% of the light from the source is modulated. Twice as much light from the source as with an analagous conventional electro-optic shutter is modulated.

The present invention thus provides an electro-optic shutter capable of modulating light effectively with an unprecedently small input signal. Since certain changes may be made in the above apparatus without departing from the scope of the invention herein involved, it is intended that all matter contained in the above description or shown in the accompanying drawing shall be interpreted in an illustrative and not in a limiting sense.

What is claimed is:
1. An electro-optic shutter comprising,
  (a) a polarizing beam splitter for reflecting a first portion of incident light having a first polarization along a first path and for transmitting a second portion of said incident light having a second polarization along a second path,
  (b) first electro-optic means in said first path for rotating the polarization of said first portion of incident light in response to an applied electrical signal,
  (c) second electro-optic means in said second path for rotating the polarization of said second portion of incident light in response to an applied electrical signal,
  (d) means for applying an electrical signal to said first and second electro-optic means,
  (e) means for reflecting said first portion of incident light back through said first electro-optic means along said first path to said polarizing beam splitter in such a manner that in the absence of an applied electrical signal, said reflected first portion is transmitted through said polarizing beam splitter, and
  (f) means for reflecting said second portion of incident light back through said second electro-optic means along said second path to said polarizing beam splitter in such a manner that in the absence of an applied electrical signal, said reflected second portion is reflected by said polarizing beam splitter.

2. The electro-optic shutter of claim 1 wherein said first and second electro-optic means each comprise a primary ammonium phosphate crystal.

3. An electro-optic shutter comprising a first glass prism having a pair of leg faces of equal length at right angles to each other and a hypotenuse face extending therebetween, a second glass prism having a pair of leg faces of equal length at right angles to each other and a hypotenuse face extending therebetween, the hypotenuse face of said first prism and the hypotenuse face of said second prism being adjacent to each other, a polarizing beam splitter interposed between and laminated to said hypotenuse face of said first prism and said hypotenuse face of said second prism, one leg face of first prism and one leg face of said second prism being parallel to each other and being perpendicular to a first axis extending therethrough, the other leg face of said first prism and the other leg face of said second prism being parallel to each other and being perpendicular to a second axis, a first optical control assemblage laminated to said other leg face of said first prism, a second optical control assemblage laminated to said one leg face of said second prism, said first optical control assemblage including a first outer metallic reflector perpendicular to said first axis and, between said first outer metallic reflector and said other leg face of said first prism, a first plate which rotates polarization in response to an electrical signal and a first quarter wave retarding plate, said second optical control assemblage including a second outer metallic reflector perpendicular to said second axis and, between said second outer metallic reflector and said one leg face of said second prism, a second plate which rotates polarization in response to an electrical signal and a second quarter wave retarding plate, and means for applying electric potential across said first electro-optic plate and said second electro-optic plate.

4. The electro-optic shutter of claim 3 wherein each of said first plate and said second plate is composed of a primary ammonium phosphate crystal having its Z axis parallel to the axis of its respective control assemblage.

5. The electro-optical shutter of claim 4 wherein transparent electrodes are provided at opposed optic surfaces of each of said first plate and said second plate where said optic surfaces are perpendicular to its respective Z axis.

6. An electro-optic shutter as defined in claim 3, wherein said beam splitter comprises a Banning polarizer.

References Cited

UNITED STATES PATENTS

| | | | |
|---|---|---|---|
| 2,106,752 | 2/1938 | Land | 88—1 X |
| 2,745,316 | 5/1956 | Sziklai | 88—61 |
| 2,780,958 | 2/1957 | Wiley | 88—61 |
| 3,175,088 | 3/1965 | Herriott | 88—61 X |
| 3,200,698 | 8/1965 | Froom et al. | 88—61 X |

OTHER REFERENCES

Banning: "Practical Methods of Making and Using Multilayer Filters," J.O.S.A., vol. 37, No. 10, October 1947, pp. 792–797.

JEWELL H. PEDERSEN, *Primary Examiner.*

E. S. BAUER, *Assistant Examiner.*